Sept. 10, 1940.　　　　E. H. WHITE　　　　2,214,264
CONTROL APPARATUS
Filed March 11, 1938　　　2 Sheets-Sheet 1

INVENTOR.
EVERETT H. WHITE
BY G. H. Braddock
ATTORNEY

Sept. 10, 1940. E. H. WHITE 2,214,264
CONTROL APPARATUS
Filed March 11, 1938 2 Sheets-Sheet 2
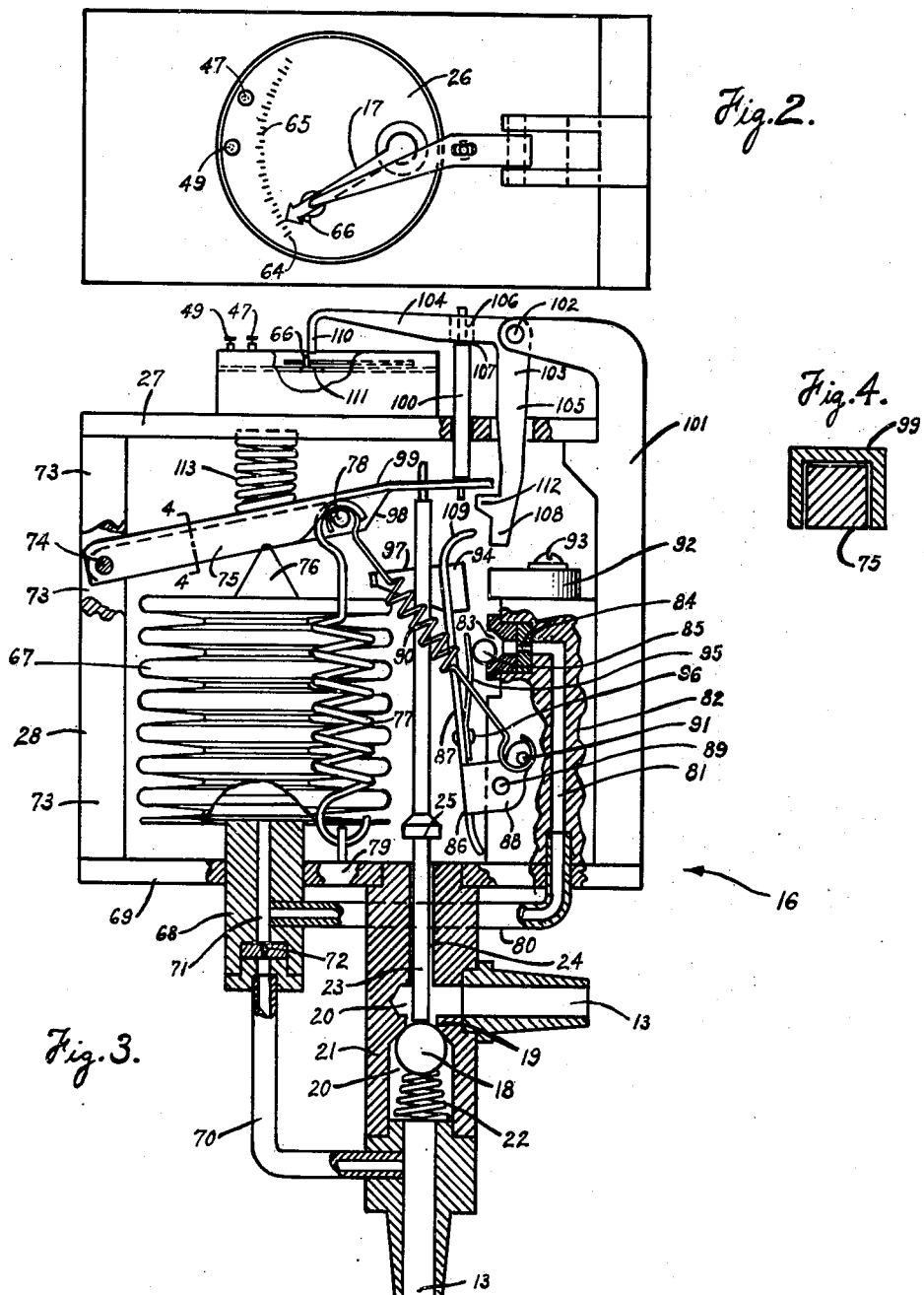
INVENTOR.
EVERETT H. WHITE
BY G. H. Braddock
ATTORNEY Patented Sept. 10, 1940

2,214,264

UNITED STATES PATENT OFFICE 2,214,264

CONTROL APPARATUS

Everett H. White, St. Paul, Minn.

Application March 11, 1938, Serial No. 195,419

9 Claims. (Cl. 99—271)

This invention relates to a control apparatus, and has more especial reference to an apparatus adapted to the purposes (1) of causing a gas, such, for example, as carbon dioxide, to be fed into an enclosed space to be there mixed with a different gas or gases, such, for example, as air, and (2) of controllably accomplishing or regulating the feed of said gas such as carbon dioxide into said enclosed space having said different gas or gases such as air in such manner as to, within limits, continuously maintain the concentration of the gaseous content, or atmosphere, comprised of both said gas and said different gas or gases, in said enclosed space at any desired and predetermined value.

It has heretofore been common practice to subject animal and vegetable materials, such as food stuffs and flowers, which are to be preserved to atmosphere, usually kept at relatively low temperature, containing a quantity of carbon dioxide. As is well known, different animal and vegetable materials to be preserved for different periods of time are required to be constantly subjected to atmospheres including concentrations of carbon dioxide which are in certain instances different from the concentrations in other instances if satisfactory preservation results are to be accomplished upon the materials. More specifically, in the instance of one or another animal or vegetable material to be preserved, or of a particular animal or vegetable material to be preserved for a longer or a shorter period of time, it is essential to the attainment of, or the approach toward, maximum preservation results that the material be subjected to an atmosphere concentrated with, or including, a quantity of carbon dioxide predetermined to be that quantity which is proper or most suitable for best accomplishing preservation of said material over the period of time it is intended to be stored for preservation.

The control apparatus of the present invention may be put to other uses, but it has been designed and illustrated to be, and will be described hereinafter as, more especially useful for the purposes (1) of originally establishing a concentration of atmosphere with carbon dioxide of any desired and predeterminedly selected value in an enclosed space adapted to receive animal and/or vegetable materials to be preserved; the concentration of atmosphere with carbon dioxide selected to be established in a particular instance of course to have value which is proper or most suitable for accomplishing the best preservation results upon the particular material or materials to be preserved; and (2) of thereafter continuously maintaining, substantially accurately and satisfactorily in actual practice, the concentration of atmosphere with carbon dioxide in said enclosed space at the desired and predeterminedly selected value at which originally established. It is to be understood, however, that the control apparatus can be employed within the principles of the invention to establish and maintain any selected concentration of mixed gases other than air and carbon dioxide in an enclosed space, whether said enclosed space is to be employed as a storage compartment for food stuffs or flowers to be preserved, or is to be employed for some other useful purpose.

An object of the invention is to provide a novel and improved control apparatus which will be capable of causing a gas such as carbon dioxide to be fed into an enclosed space housing a different gas or gases such as air, of establishing a gaseous content, or atmosphere, comprised of said gas and said different gas or gases, in said enclosed space having any desired and predeterminedly selected concentration value, and of continuously maintaining, sufficiently accurately for all practical purposes, the concentration of said gaseous content, or atmosphere, in the enclosed space at the value established by the control apparatus.

A further object is to provide a control apparatus for the general purposes as stated and wherein will be incorporated various improved features and characteristics of construction novel both as individual entities of the control apparatus and in combination with each other.

A further object is to provide a control apparatus of the nature as stated, adapted to cause a gas to be fed into an enclosed space housing a different gas or gases and to establish and maintain a gaseous content, comprised of said gas and said different gas or gases, in said enclosed space having a desired and predeterminedly selected concentration value, which will include pressure actuated means capable of operation to cause flow of the first mentioned gas from a source of supply thereof into said enclosed space until the enclosed space contains a quantity of said first mentioned gas to constitute, together with said different gas or gases, a gaseous content in said enclosed space having said desired and predeterminedly selected concentration value and to cause the supply of said first mentioned gas to the enclosed space to be shut off when said enclosed space contains a gaseous content having said desired and predeterminedly selected concentration value.

A further object is to provide a control apparatus of the nature as stated, adapted to cause a gas to be fed into an enclosed space housing a different gas or gases and to establish and maintain a gaseous content, comprised of said gas and said different gas or gases, in said enclosed space having a desired and predeterminedly selected concentration value, which will include a source of supply of said first mentioned gas under pressure, and means adapted to be actuated by pressure of gas from said source and capable of operation to cause flow of the first mentioned gas from said source into said enclosed space until the enclosed space contains a quantity of said first mentioned gas to constitute, together with said different gas or gases, a gaseous content in said enclosed space having said desired and predeterminedly selected concentration value and to cause the supply of said first mentioned gas to the enclosed space to be shut off when said enclosed space contains a gaseous content having said desired and predeterminedly selected concentration value.

A further object is to provide a control apparatus of the nature as stated, adapted to cause a gas to be fed into an enclosed space housing a second gas or gases having physical properties different from the physical properties of said first mentioned gas and to establish and maintain a gaseous content, comprised of said gas and said second gas or gases, in said enclosed space having a desired and predeterminedly selected concentration value, which will include mechanism capable of operation to cause flow of the first mentioned gas from a source of supply thereof into said enclosed space until the enclosed space contains a quantity of said first mentioned gas to constitute, together with said second gas or gases, a gaseous content in said enclosed space having said desired and predeterminedly selected concentration value, and an entity adapted to be controllably moved to a plurality of different positions in response to alterations or fluctuations of the physical properties of the gaseous content in said enclosed space due to or caused by the presence of larger or smaller quantities of said first mentioned gas in said enclosed space and to render said mechanism incapable of operation to cause flow of the first mentioned gas into said enclosed space when the gaseous content in the enclosed space possesses said mentioned desired and predeterminedly selected concentration value.

A further object is to provide a control apparatus of the nature as stated, adapted to cause a gas to be fed into an enclosed space housing a second gas or gases having physical properties different from the physical properties of said first mentioned gas and to establish and maintain a gaseous content, comprised of said gas and said second gas or gases, in said enclosed space having any desired and predeterminedly selected concentration value, which will include mechanism capable of operation intermittently or periodically to cause flow of said first mentioned gas from a source of supply thereof into the enclosed space when the gaseous content in said enclosed space has concentration value different from said desired and predeterminedly selected concentration value to be established and maintained in the enclosed space, and an entity adapted to be actuated to each of a plurality of different positions in response to alterations or fluctuations of the physical properties of the gaseous content in said enclosed space due to or caused by the presence of larger or smaller quantities of said first mentioned gas in said enclosed space, including a position for said entity corresponding to a gaseous content in said enclosed space having said desired and predeterminedly selected concentration value to be established and maintained and positions for the entity corresponding to gaseous content in said enclosed space possessing variable quantities of the first mentioned gas each in amount different from the quantity of said first mentioned gas comprised as a portion of said gaseous content having said desired and predeterminedly selected concentration value, and to render said mechanism incapable of operation to cause flow of the first mentioned gas into said enclosed space when the entity is situated at the position it assumes when the gaseous content in the enclosed space possesses said mentioned desired and predeterminedly selected concentration value.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 2 is an enlarged plan view of a regulating means of the control apparatus of Fig. 1;

Fig. 3 is a view, partially in side elevation and partially in vertical section, of the regulating means of Fig. 2;

Fig. 4 is a detail sectional view, taken on line 4—4 in Fig. 3;

Fig. 5 is an enlarged elevational view, partially in section, of one type of cell which the control apparatus employs; and Fig. 6 is an enlarged elevational view, partially in section, of a different type of cell which said control apparatus employs.

Figure 1:
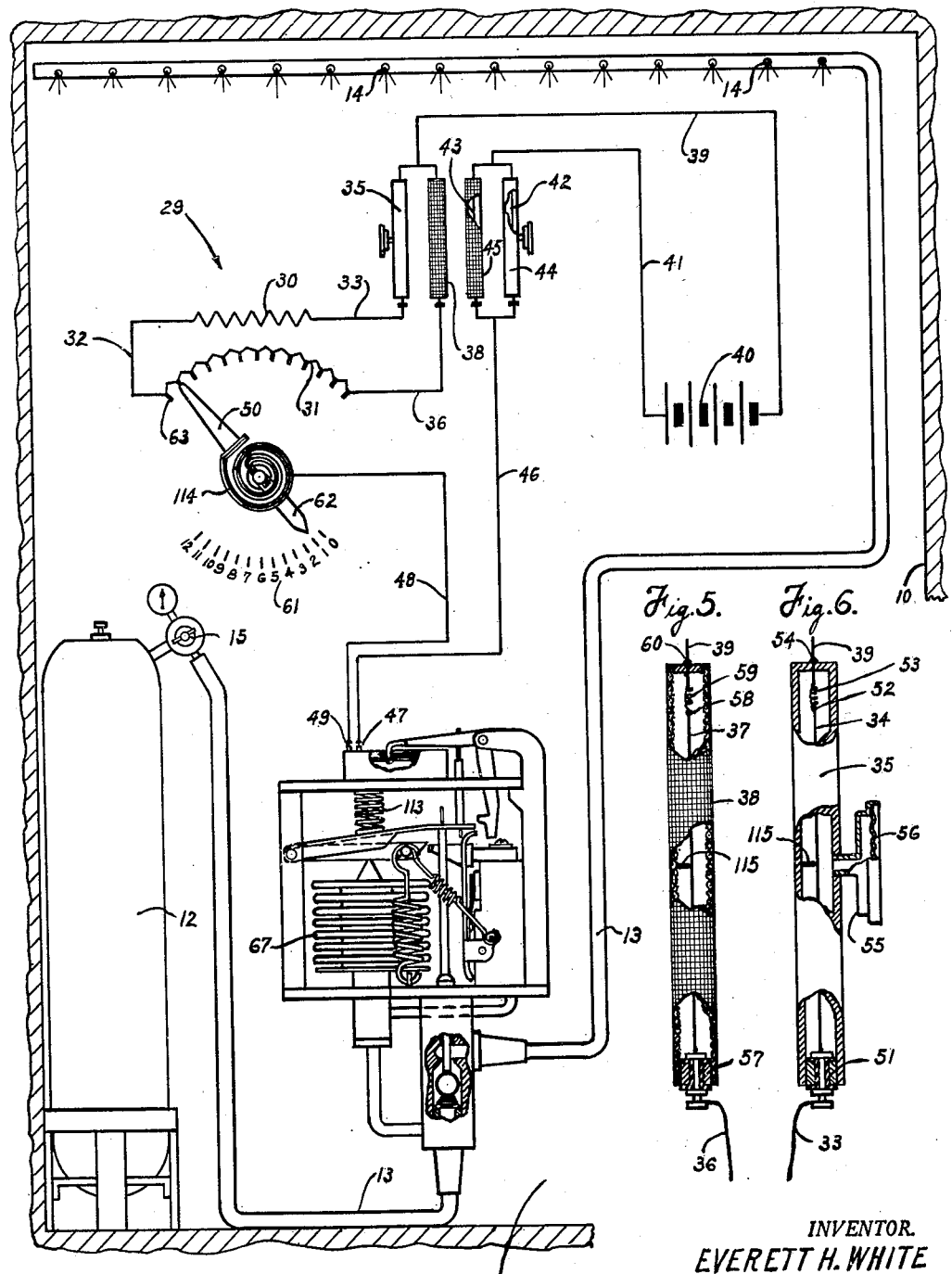
Fig. 1 is a diagrammatic view of a control apparatus made according to the invention.

With respect to the drawings and the numerals of reference thereon, a structure 10 is adapted to the purpose of providing an enclosed space 11 which in the embodiment of the invention as disclosed is intended to be used as a storage compartment or chamber for animal and/or vegetable materials, such as food stuffs and flowers, to be preserved. A tank or vessel 12 is adapted to contain solid carbon dioxide, commonly called dry ice. A pipe connection, denoted generally at 13, leads from the tank or vessel 12 and is adapted to communicate with the interior of said enclosed space 11 through outlets 14 from said pipe connection. As shown, the pipe connection 13 includes a usual reducing valve 15 therein.

The control apparatus of the invention is adapted to cause gaseous carbon dioxide to flow from the tank or vessel 12 under pressure through the pipe connection 13 into the enclosed space 11. Said enclosed space normally contains atmosphere, and the gaseous carbon dioxide made to enter the enclosed space, in the manner as stated, becomes commingled with the atmosphere therein. It is common knowledge that atmospheres permeated with carbon dioxide, when in requisite or proper amount, are better preservatives for animal and/or vegetable materials to be preserved than are atmospheres not so permeated.

In addition to causing gaseous carbon dioxide to enter the enclosed space 11, it is a function of the improved control apparatus to controllably accomplish or regulate the feed of gaseous carbon dioxide into said enclosed space. In short, the present apparatus has been designed to cause flow of carbon dioxide into the enclosed space 11 until this contains a quantity of carbon dioxide which will comprise, together with atmosphere, a gaseous content in said enclosed space having any desired concentration value which may before have been selected as proper or most suitable in a particular instance to best accomplish preservation of animal and/or vegetable material which is to be stored in the enclosed space for preservation, and to thereafter substantially accurately maintain said gaseous content at said desired and previously selected concentration value.

A regulating means of the control apparatus includes a mechanism, denoted generally at 16, for controlling flow of gaseous carbon dioxide from said tank or vessel 12 through said pipe connection 13 into the enclosed space 11, and an entity 17 adapted to be actuated to a plurality of different positions in response to alterations or fluctuations of the physical properties of the gaseous content in the enclosed space 11.

The mechanism 16 includes as a part thereof a ball valve 18 for controlling a port 19 between passageways 20 constituted as portions of the pipe connection 13 and situated in a cage 21 of said mechanism 16. A coil spring 22 is for resiliently urging the ball valve 18 to closed position of the port 19. Said ball valve 18 is at the side of said port 19 which is adjacent the tank or vessel 12, and when the ball valve is seated, flow of carbon dioxide from said tank or vessel to the enclosed space 11 is precluded. When said ball valve is moved off of its seat, however, in a manner to be set forth, there will be flow of carbon dioxide through the pipe connection 13 and the passageways 20, under pressure created at the tank or vessel 12, into the enclosed space 11. Said mechanism 16 also includes as a part thereof a vertical plunger 23 slidably mounted, as at 24, in the cage 21. The lower end of the plunger 23 is in engagement with a surface of the ball valve 18 directly opposite the coil spring 22. Said plunger 23 extends upwardly a considerable distance above said cage 21, and an intermediate portion of the plunger includes a collar 25 adapted for engagement with the cage 21 to limit the extent of downward movement of said plunger.

The entity 17 is in the disclosure as made adapted to be actuated to each of a plurality of different positions in response to difference in thermal conductivity of atmospheric air and gaseous content in the enclosed space 11 as said gaseous content becomes, or may become, altered because of the presence as a part thereof of larger or smaller quantities or portions of carbon dioxide. More specifically, the entity 17 is constituted as the needle of an ordinary microammeter 26. As shown, the microammeter 26 is mounted upon an upper cross member 27 of a frame 28 of the control apparatus, which frame suitably supports the cage 21, and said entity or needle 17 is desirably disposed to have movement in a horizontal plane. The positions which the entity or needle 17 is capable of assuming include a position for said entity or needle corresponding to a quantity of carbon dioxide in the enclosed space which comprises, together with the atmosphere, a gaseous content in said enclosed space having the desired and predeterminedly selected concentration value to be established and maintained and positions for the entity or needle corresponding to variable quantities of carbon dioxide in the enclosed space each less than the quantity of carbon dioxide comprised as a portion of said gaseous content having said desired and predeterminedly selected concentration value.

The microammeter 26 is electrically connected into a Wheatstone bridge arrangement, indicated generally at 29. In the disclosure as made, said Wheatstone bridge arrangement includes a fixed resistance 30 and an adjustable resistance 31 having value in its entirety exactly equal to the value of said fixed resistance 30. A lead wire 32 connects an end of the fixed resistance 30 to an end of the adjustable resistance 31. The opposite end of said fixed resistance 30 is connected by a lead wire 33 to an end of a resistance wire 34 housed in and stretched across a cylindrical closed cell 35, and the opposite end of said adjustable resistance 31 is connected by a lead wire 36 to an end of a resistance wire 37 housed in and stretched across a cylindrical perforate cell 38. The ends of the resistance wires 34 and 37, respectively, opposite the lead wires 33 and 36 are connected by a lead wire 39, common to both of said resistance wires 34 and 37, to one side of a battery 40. A lead wire 41 extends from the other side of said battery 40 and is commonly connected to an end of each of resistance wires 42 and 43. The resistance wire 42 is of the same structure as is the resistance wire 34 and is similarly housed in a cylindrical cell 44 of the same construction as the cell 35, and the resistance wire 43 is of the same structure as is the resistance wire 37 and is similarly housed in a cylindrical cell 45 of the same construction as the cell 38. A lead wire 46 commonly connects the ends of the resistance wires 42 and 43 which are opposite the lead wire 41 to one terminal 47 for the microammeter 26, and a lead wire 48 extends between the other terminal 49 for said microammeter and a movable switch arm 50 in engagement with, and adapted to the purpose of adjusting the value of, the adjustable resistance 31.

The construction of each of the duplicate cylindrical closed cells 35 and 44 is best understood from Fig. 6, where the closed cell 35 is disclosed in detail. The resistance wire 34 is suitably stretched centrally through the length of the cell and is at one of its ends insulated from and made rigid with said cell, as at 51. Said resistance wire 34 may be of nickel. At 52 the nickel resistance wire 34 is soldered to a coiled wire 53, which is for holding the nickel wire taut, and the coiled wire 53 is fixed, as at 54, in the end of said cell 35 opposite the insulation 51. An expansion chamber 55 upon each closed cell and in communication with the interior of the cell is covered by a flexible diaphragm 56 useful to the purpose of compensating for variations in operating results which might occur due to changes in barometric pressure were the arrangement as illustrated and described not employed.

The construction of each of the duplicate cylindrical perforate cells 38 and 45 is best understood from Fig. 5, where the perforate cell 38 is disclosed in detail. The resistance wire 37 is suitably stretched centrally through the length of the cell and is at one of its ends insulated from and made rigid with said cell, as at 57. Said resistance wire 37 may also be of nickel. At 58 the nickel resistance wire 37 is soldered to a coiled wire 59, which holds the nickel wire taut, and the coiled wire 59 is fixed, as at 60, in the end of the cell 38 opposite the insulation 57. The enclosing or side wall of each perforate cell 38 and 45 as shown composed of screening of comparatively fine mesh.

Each of the resistance wires 34 and 37 is desirably supported as at 115 to eliminate possible vibration of the wire.

It is essential to the operation of the control apparatus that the perforate cells 38 and 45 be situated within the enclosed space 11. The closed cells 35 and 44 are ordinarily adapted to contain atmospheric air. Said cells 35 and 44 may be situated either within or without said enclosed space 11.

A scale 61 for the movable switch arm 50 is so positioned with respect to the adjustable resistance 31 that when a pointer 62 secured to said movable switch arm denotes zero on said scale 61 the switch arm is, or may under certain conditions be, engaged with the end 63 of said adjustable resistance which is attached to the lead wire 32. It will be apparent, assuming the enclosed space 11 to contain only atmosphere so that the resistance wires 34, 37 and 42, 43 are all subject to the same condition, that when the movable switch arm 50 is engaged with the end 63 of the adjustable resistance 31, the Wheatstone bridge will be balanced for the reason that the resistances 30 and 31 are of equal value, and the entity or needle 17 of the microammeter 26 will be, or have tendency toward being, at zero point 64 upon the scale 65 of said microammeter. However, and still assuming that the enclosed space contains only atmosphere, when the movable switch arm 50 is moved toward the right in Fig. 1, to cause the adjustable resistance 31 to have value less than the value of the fixed resistance 30, said entity or needle 17 will move to a position away from and higher than its zero position, the extent of the movement of said entity or needle being directly proportional to the extent to which said movable switch arm is moved along said adjustable resistance 31. In the disclosure as made, the entity or needle 17 is prevented by a stop 66 from reaching its zero position in microamperes, said stop being arranged not far distant from said zero position. The stop 66 could, however, be arranged at the zero point 64.

The mechanism 16 and the entity or needle 17 are so related to each other that when said entity or needle is in position against the stop 66 it is situated to render said mechanism incapable of operation to move the ball valve 18 off of its seat, and when the entity or needle is otherwise situated, the mechanism 16 is capable of operation to move said ball valve 18 to open position against the resilient action of the coil spring 22. Stated otherwise, the mechanism 16 is adapted to move the ball valve 18 off of its seat, intermittently or periodically in the disclosure as made, to cause carbon dioxide to flow into the enclosed space 11 and when this is made to contain a quantity of carbon dioxide which comprises, together with the atmosphere, a gaseous content having a desired concentration value, it is the function of the entity or needle 17 to cause said mechanism 16 to be inoperative to move said ball valve 18 away from its seat. At times when the enclosed space 11 contains variable quantities of carbon dioxide less than the quantity comprised as a portion of a gaseous content in said enclosed space having the desired concentration value, the entity or needle 17 is spaced from the stop 66 to denote a measurement on the scale which has direct relation to the amount of carbon dioxide in the enclosed space 11, said denoted measurement being inversely proportional to the carbon dioxide content of said enclosed space. That is, when the carbon dioxide content in the enclosed space 10 is smaller, the denoted measurement on the scale is greater, and vice versa. When the enclosed space is made to include the quantity of carbon dioxide for which the control apparatus is set, the entity or needle 17 is made to reach its position against the stop 66, at which position it will function to render the mechanism 16 inoperative to open the valve 18.

The extent to which the movable switch arm 50 is adjustably moved along the adjustable resistance 31 in direction away from the end 63 thereof predetermines the quantity of carbon dioxide which is to be maintained in the enclosed space 11, the quantity to be proportionately larger with greater adjustment and proportionately smaller with less adjustment of said movable switch arm. The exact amount of carbon dioxide it is desired that the enclosed space shall contain can be predeterminedly selected by reference of the pointer 62 to the scale 61. As before mentioned, when the switch arm 50 is moved toward the right in Fig. 1, the Wheatstone bridge 29 is unbalanced, and the entity or needle 17 is moved toward a higher value on the scale 65. When the mechanism 16 opens the valve 18 to cause carbon dioxide to be fed into the enclosed space, the entity or needle 17 will be caused to move gradually back toward its zero position, for the well known and obvious reason that the resistance of the resistance wires 37 and 43, subjected to the gaseous content of the enclosed space, will become proportionately greater as the quantity of carbon dioxide in said enclosed space is increased, whereas the resistance of the resistance wires 34 and 42, subjected to air trapped in the closed cells 35 and 44, will remain substantially constant. Naturally, when the gaseous content of the enclosed space has included as a portion thereof the intended quantity of carbon dioxide, the entity or needle 17 has moved back to its position of engagement with the stop 66.

A vertically disposed bellows 67 of the mechanism 16 is suitably and conveniently supported upon a fitting 68 itself carried by a lower cross member 69 of the frame 28. A pipe connection 70 leads from a portion of the pipe connection 13 between the tank or vessel 12 and the ball valve 18 and connects with the fitting 68 to communicate with a vertical channel 71 through said fitting and opening to the interior of the bellows 67. The channel 71 includes a restriction 72. The pipe connection 70 could just as well lead from the tank or vessel 12 to the fitting 68 independently of the pipe connection 13, and, in fact, said pipe connection 70 could lead to said fitting 68 from a source of supply of air or other gas under pressure other than the source of supply which the solid carbon dioxide in the tank or vessel 12 constitutes. Gas under pressure, carbon dioxide from the tank or vessel 12 as disclosed, is adapted to travel through the pipe connection 70 and the channel 71, past the restriction 72 in said channel 71, and into the bellows 67.

Vertical members 73 at one side of the frame 28 pivotally support, as at 74, a substantially horizontally inwardly extending lever 75. An intermediate portion of said lever 75 engages a boss 76 upon the upper wall or surface of the bellows 67, and coil springs 77, one being shown, are for urging the lever 75 downwardly against the boss 76 to thus cause the bellows 67 to have tendency toward being shortened against the action of gas under pressure adapted to at times cause said bellows to be lengthened. Each coil spring 77 has its upper end engaged with a pin 78 upon the free end portion of the lever 75 and its lower end secured to the frame 28 as at 79.

A pipe connection 80 leads from a portion of the channel 71 between the restriction 72 and the bellows 67 to a channel 81 in a second fitting 82 suitably supported upon the frame 28. The channel 81 leads to an outlet 83 from the fitting 82 through a port 84 of less diameter than said channel 81 but of considerably greater diameter than the restriction 72. The channel 81 receives gas under pressure from the channel 71. The outlet 83 is constituted as a part-spherical, vertically disposed valve seat, and a ball valve 85 is adapted to be brought at times into engagement with said valve seat to preclude the escape of gas under pressure from the channel 81 and to become removed at times from the valve seat to permit the escape of gas from said outlet 83 at rate of flow faster than the gas, carbon dioxide as illustrated, will flow through the restriction 72 from its source of supply.

Devices for causing the ball valve 85 to become engaged with its seat to close the outlet 83 and hold it closed, and for permitting said ball valve 85 to become removed from its seat by reason of pressure of gas in the channel 81, include an L-shape lever 86. A longer, upper arm 87 of the lever 86 is upstanding and a shorter, lower arm, or arms, 88 of said lever 86 has its intermediate portion pivoted, as at 89, upon the fitting 82. One or more coil springs 90, one being shown, have their upper ends engaged with the pin or pins 78 and their lower ends engaged with a pin or pins 91 upon the arm or arms 88 and located at the side of the pivot 89 opposite the longer, upper arm 87. The coil springs 90 have potential, which is increased as the bellows 67 is elongated and the lever 75 is thus elevated, to move or swing the longer, upper arm 87 of the lever 86 in direction away from the fitting 82 and the closing position of the ball valve 85. A permanent magnet 92, fixed as at 93 upon the upper surface of the fitting 82, is adapted to the purpose of causing the longer, upper arm 87 of the lever 86 to be moved toward and held in closing position of the ball valve 85. To this end, said longer, upper arm 87 rigidly carries a suitable armature 94 for said magnet, said armature 94 being situated substantially in the plane of said magnet, which plane is horizontal as disclosed.

The longer, upper arm 87 of the lever 86 does not itself directly cause the ball valve 85 to become seated and to remain in seated, closed position of the outlet 83. Instead, a leaf spring or resilient member 95, disposed between the longer, upper arm 87 and the ball valve 85, in the vertical and horizontal plane of said ball valve, has its lower portion secured, as at 96, to the longer, upper arm 87 and its upper portion disposed in substantially parallel, slightly spaced relation to said longer, upper arm.

The devices for controlling the ball valve 85 additionally include an actuator element 97 rigid upon the longer, upper arm 87 of the lever 86, directly opposite the armature 94 as shown, adapted to be engaged by the beveled or oblique outer end or surface 98 of the lever 75 when this lever is caused to be moved downwardly by the coil spring or springs 77, in a manner to be made plain, and thus actuated in direction toward said ball valve.

Said devices for controlling the ball valve 85 also include elements for positively moving or swinging the longer, upper arm 87 of the lever 86 in direction away from the ball valve 85 and thus causing the armature 94 to be released from the magnet 92 when the bellows 67 is caused to become elongated by reason of pressure of gas therein. Of said mentioned elements, numeral 99 denotes a lever, which is independent of the lever 75, disposed directly above said lever 75 in vertical alinement therewith and having one of its ends mounted upon the pivot 74. The lever 99 is longer than the lever 75, and the free end portion of said lever 99 is disposed directly below an upright or vertical actuator post 100. The post 100 is mounted in the cross member 27 of the frame 28 to be freely slidable therein, and the lower end of said post 100 rests upon the upper surface of said lever 99. A vertical member 101 of said frame 28 pivotally supports, as at 102, an L-shape lever 103 including a substantially horizontal arm 104 and a substantially vertical arm 105. The pivotal support 102 for said lever 103 is as disclosed at the juncture between said arms 104 and 105. A reduced extension upon the upper end of the actuator post 100 freely enters an opening 106 in the horizontal arm 104 and provides a shoulder 107 upon said post engaged beneath said arm 104. A lower portion 108 of the vertical arm 105 of the lever 103 is disposed in horizontal alinement with an upper extension 109 of the longer, upper arm 87 of the lever 86, above the armature 94, at the side of said extension 109 and arm 87 adjacent the magnet 92.

Certain of the elements as already described additionally function in cooperation with other elements of the control apparatus to the purposes of causing the ball valve 18 to be intermittently or periodically opened and closed when the enclosed space 11 has gaseous content including carbon dioxide in quantity less than the quantity which a particular setting of said control apparatus intends, and of rendering the mechanism 16 incapable of moving said ball valve 18 off of its seat when the entity or needle 17 is at its position of engagement with the stop 66. To the accomplishment of these last mentioned purposes, the horizontal arm 104 of the lever 103 has a finger 110 upon its free end. Said finger 110 extends downwardly from said arm 104 and is situated directly above an opening 111 in the microammeter 26, said opening 111, being located adjacent the stop 66 to be directly below the entity or needle 17 when this is engaged with said stop. The arrangement is such that the finger 110, at times as to be set forth, may enter the opening 111 when the entity or needle 17 is at any of its positions except its position against the stop 66 in covering relation to said opening 111, but is precluded from entering the opening 111 by said entity or needle when this covers said opening. The horizontal arm 104 of the lever 103 has sufficient weight to overbalance the vertical arm 105 of said lever, and said vertical arm 105 includes a hook or ledge 112 upon its lower portion which is adapted during the operation of the control apparatus to be positioned at times beneath the outer end portion of the lever 99, as disclosed in Fig. 3, and to be positioned at times clear of said lever 99, as disclosed in Fig. 1. An outer portion of the lever 99 is directly above the upper end of the plunger 23 in vertical alinement therewith, and said plunger 23 is adapted to be engaged by said lever 99 under pressure exerted by a coil spring 113 situated between the cross member 27 and the lever 99 to be thus urged downwardly to move the ball valve 18 off of its seat against the action of the coil spring 22 at certain times during the operation of the control apparatus when the hook or ledge 112 is clear of said lever 99.

Suppose, for the sake of convenience of explanation, that the control apparatus is placed in operation when the bellows 67 is shortened or depressed and the ball valve 85 is in seated position. Immediately, gas pressure begins to be built up within said bellows 67, at the rate of course which the restriction 72 permits, and the bellows commences to lengthen or expand against the resilient action of the coil spring or springs 77. Lengthening or expansion of said bellows 67 causes the lever 75 to be moved or swung upwardly, and upward movement of said lever 75 increases the potential of the coil springs 90 which have tendency toward moving or swinging the longer, upper arm 87 of the lever 86 away from the ball valve 85. The attraction of the magnet 92 for the armature 94 is of sufficient magnitude to preclude the coil springs 90 when acting alone, even under their greatest tension, from removing said armature 94 from engaged relation with said magnet 92, and, obviously, as long as the ball valve 85 engages its seat, the bellows 67 will continue to elongate or expand, of course assuming a pressure in the pipe connection 70 sufficient to elongate or expand the bellows, at first against the combined resilient action of the coil springs 77 and 90, and later against the combined resilient action of the just mentioned coil springs and the coil spring 113. Eventually, and while the armature 94 is engaged with the magnet 92, the bellows 67 is elongated or expanded by the gas pressure to an extent causing the lever 75 to push the lever 99 upwardly and cause it to elevate the vertical actuator post 100, with force applied by reason of pressure of gas in the bellows 67. Elevation of said actuator post, which has its shoulder 107 engaged with the horizontal arm 104 of the lever 103, causes said horizontal arm to be moved or swung upwardly and the vertical arm 105 of said lever 103 to as a result be moved or swung in direction toward the extension 109 upon the longer, upper arm 87 of the lever 86, inwardly as disclosed. The arrangement is such that the lower portion 108 of the arm 105 will engage said extension 109 and cause the longer, upper arm 87 of the lever 86 to be moved a slight distance away from the ball valve 85 and the fitting 82 and the armature 94 to be forcibly separated from the magnet 92. The just mentioned movement of said arm 87 by the arm 105 under pressure of gas in the expanding bellows 67 will not, however, cause the ball valve 85 to be unseated, for the reason that the leaf spring 95 is flexed toward the arm 87 when the magnet 92 is retaining the armature 94, and during the positive separating movement of said armature 94 from said magnet 92 by said arm 105 said leaf spring 95 is urged outwardly from the arm 87 because of its natural resilience to maintain said ball valve 85 against its seat, as will be understood. The pull of the magnet 92 upon the armature 94 varies of course, as does the pull of any magnet, inversely as the square of the distance between the magnet and armature, and the arrangement as illustrated is such that the arm 105 positively removes the armature 94 away from the magnet 92 a distance less than is required to cause the leaf spring 95 to permit the ball valve 85 to become unseated, but sufficiently great to render said magnet unable to retain said armature against the action of the coil springs 90, which coil springs are at the time the armature is positively separated from the magnet in the manner as stated under considerable potential or tension because of the fact that the lever 75 is elevated. Said lever 75 is in fact at or adjacent to the highest position it can assume when the arm 105 causes the armature 94 to be positively released from the magnet 92, because immediately upon positive separation of said armature from said magnet, the coil springs 90 act to move or swing the arm 87 of the lever 86 in direction further away from the ball valve 85 and the fitting 82 and to cause the leaf spring 95 to be released or relieved from said ball valve 85 with a snap action.

Immediately upon release or relief of the ball valve 85 from its seat, said ball valve is caused by pressure of gas to become removed from its seat, as in Fig. 3, and the arrangement is such that opening of the outlet 83 causes pressure of gas in the bellows 67 to become greatly reduced. More specifically, when the ball valve 85 is off of its seat, gas is permitted to escape from the outlet 83 faster than it can build up in the channel 71 and the interior of the bellows 67 by passage from the source of supply through the restriction 72, because, as before stated, the pipe connection 80, the channel 81 and the port 84 have capacity for flow of the gas at rate considerably greater than the rate at which the gas can flow from its source through the restriction 72. In practice, movement of the ball valve 85 to open position causes the pressure of gas in the bellows 67 to be reduced to an extent which will permit the coil springs, 77, 90 and 113 at first, and 77 and possibly 90 finally, to more or less gradually shorten or depress said bellows 67 by forcing the levers 75 and 99 downwardly. As said lever 75 is moved downwardly, its beveled or oblique end or surface 98 is brought into contact with the actuator element 97, and, through the instrumentality of said actuator element 97 the longer, upper arm 87 of the lever 86 is moved toward the ball valve 85 and the fitting 82. The arrangement is such that engagement of the beveled or oblique surface 98 with the actuator element 97 does not cause the leaf spring 95 to have movement actually seating the ball valve 85. Rather, it is necessary that said ball valve be closed with a snap action, as well as opened with a snap action, so that the bellows 67 cannot possibly become balanced. To this end, the beveled or oblique surface 98 causes the longer, upper arm 87 of the lever 86 to be moved or swung a distance to position the leaf spring 95 at location just short of seating said ball valve, and, when said arm 87 so positions said leaf spring, the magnet 92, now operating against considerably reduced potential or tension possessed by the coil springs 90 due to the lowered position of the lever 75, quickly attracts the armature 94 and thus causes the arm 87 to be moved toward the fitting 82 with a jerk and the leaf spring 95 to seat the ball valve 85 with the desired snap action. As soon as the ball valve 85 becomes seated, pressure again begins to be built up in the bellows 67 and the operations as described are repeated. In practical operation of the control apparatus, the operation of the mechanism 16 as thus far described will be continuously repeated regardless of whether the ball valve 18 is seated as in Fig. 3 or is unseated as in Fig. 1.

Suppose now that operations of said mechanism 16 as before described are being carried out or repeated while the space 11 contains no carbon dioxide, or contains a quantity of carbon dioxide less than the quantity for which the movable switch arm is set. In such event, the entity or needle 17 will be at one of its positions other than its position against the stop 66 and over the opening 111. Suppose also, for the sake of convenience of explanation, that the bellows 67 is shortened or depressed, that the ball valve 85 is seated, that the finger 110 is situated in the opening 111 so that the hook or ledge 112 is removed from the lever 99, and that the ball valve 18 is unseated due to the fact that the lever 99 is bearing down against the vertical plunger 23 so that the collar 25 on said plunger is engaged with the cage 21, as the parts of the control apparatus are disclosed in Fig. 1. Pressure builds up in said bellows 67 in the manner as already stated to accomplish the operations of the mechanism 16 as hereinbefore set forth. Upon upward movement of the lever 99, to position just below the position where said lever 99 engages the vertical actuator post 100, the ball valve 18 is released to the closing action of the coil spring 22. Stated differently, as the lever 99 is elevated it is gradually removed from the vertical plunger 23 to permit the ball valve 18 to be moved to its seat by the coil spring 22. Upward movement of said lever 99 which causes the actuator post 100 to elevate the horizontal arm 104 of the lever 103 to thus cause the vertical arm 105 of said lever to separate the armature 94 from the magnet 92, as before set forth, also causes the finger 110 to be elevated and thus removed from the opening 111. Upon the commencement of downward movement of the levers 75 and 99 as before set forth, which downward movement commences immediately upon the ball valve 85 becoming unseated, the horizontal arm 104 of the lever 103 becomes depressed by gravity so that the finger 110 enters the opening 111 and the vertical arm 105 of said lever 103 becomes actuated, or overbalanced, to remove the hook or ledge 112 from position beneath said lever 99. Continued downward movement of the lever 99, under action of the coil spring 113, forces the plunger 23 down to remove the ball valve 18 from its seat. Downward movement of said plunger 23 and said lever 99 is stopped by engagement of the collar 25 with the cage 21. With seating of the ball valve 85, in the manner as before set forth, pressure again begins to be built up in the bellows 67 and all of the operations are repeated. Evidently, the ball valve 18 is moved intermittently or periodically to open and closed positions during operation of the control apparatus to cause the intended quantity of carbon dioxide to be present in the enclosed space 11. When said enclosed space contains the requisite amount of carbon dioxide, the entity or needle 17 is at its position against the stop 66 and over the opening 111, as already stated. When said entity or needle 17 is in position covering said opening 111 and the levers 75 and 99 move downwardly, after having moved upwardly to elevate the entity or needle, downward movement of the finger 110 is precluded by said entity or needle, and thus is the hook or ledge 112 maintained beneath the lever 99 to arrest downward movement of said lever 99 required to cause the ball valve 18 to be moved from its seat. Stated differently, when the entity or needle arrests downward movement of the finger 110, the hook or ledge 112 upon the vertical arm 105 of the lever 103 renders the mechanism 16, and more specifically the lever 99 thereof, incapable of actuating the ball valve 18. Once during each upward and downward movement, or reciprocation, of the bellows 67 the finger 110 is lifted completely out of the opening 111 to spaced position above said opening. Thus said finger 110 can possibly offer no more than momentary and negligible or insignificant interference to engagement of the entity or needle 17 against the stop 66.

There will of course be escape of carbon dioxide from the enclosed space 11 after this has been made to house a gaseous content having carbon dioxide in intended quantity. As soon as the quantity of carbon dioxide is reduced to an extent causing the entity or needle to uncover the opening 111, additional carbon dioxide will obviously be made to enter said enclosed space until said entity or needle assumes its position against the stop 66.

Desirably, the pointer 62 may be connected to the movable switch arm 50 through the instrumentality of a bimetallic strip 114 the evident purpose of which is to constitute a thermostatic compensator which will cause said pointer 62 and switch arm 50 to adjust their relative positions with change of temperature. As shown, the movable switch arm 50 is situated within the enclosed space 11. Ordinarily, the carbon dioxide content of said enclosed space should be increased somewhat for higher temperatures and decreased somewhat for lower temperatures in the enclosed space. The bimetallic strip or thermostatic compensator 114 is adapted to the purpose of moving the switch arm 50 relatively to the pointer 62 upon alteration of temperature in the enclosed space and so that said switch arm will adjust itself along the adjustable resistance 31 to a location which will cause a predetermined quantity of carbon dioxide to be included in the gaseous content of the enclosed space 11 selected to be proper for or most suitable to the temperature condition in said enclosed space, as well as proper for or most suitable to other conditions in the enclosed space required to be considered and hereinbefore briefly mentioned.

The control apparatus can incorporate a microammeter which is sensitive to variation in the proportion of carbon dioxide to atmosphere in an enclosed space in amount less than one half of one percent, and when properly constructed and installed can be depended upon to, and does in actual use, constantly maintain the intended proportion of carbon dioxide to atmosphere in an enclosed space within an amount less than one percent. In the disclosure as made, the entity or needle 17 is quite stably mounted and balanced, and is not liable to be adversely affected to become unfit or inoperative for its intended or designed purpose even under the most trying or exacting conditions of use of the apparatus, as where installed to control the gaseous content of an enclosed space such as 11 included as a compartment of a freight car or automotive vehicle subject to considerable jarring and bobbing in transportation. As will be evident, the mechanism 16 is continuously operative to intermittently or periodically check the position of the entity or needle 17 at all times while the control apparatus is in operation. The ball valve 18 is engaged with its seat at intervals while the mechanism 16 is checking the position of the entity or needle. It has been found satisfactory under certain conditions of use of the control apparatus to employ an arrangement which causes said mechanism 16 to accomplish a complete up and down movement, or reciprocation, in about one minute, more or less. The mechanism 16 is, in its entirety, mechanical and requires no electrical power. The only electrical power which the control apparatus itself includes in the disclosure as made is that which the battery 40, or some equivalent source of electrical power, is employed to supply.

It is to be noted that upon either failure or lessening of the current supplied by the battery 40, or equivalent, the entity or needle 17 will be located against, or have tendency toward being located against, the stop 66 and over the opening 111 to cause the hook or ledge 112 to be positioned beneath the lever 99 and thus render said lever 99 incapable of actuating the plunger 23 to move the ball valve 18 off of its seat. That is, upon failure of the supply of current to the electrical instrument 26, the mechanism 16 will be made incapable of actuating the ball valve 18 to allow flow of carbon dioxide into the enclosed space 11, and upon lessening of the supply of current to said electrical instrument 26, said entity or needle 17 will be positioned over the opening 111 to preclude further flow of carbon dioxide into said enclosed space 11 when the enclosed space includes a quantity or proportion of carbon dioxide not as great as the amount which said enclosed space included before the supply of current to the electrical instrument was lessened. Obviously, the construction and arrangement as illustrated and described makes provision for location of the entity or needle 17 over the opening 111 in response to failure of current at the electrical instrument 26, as well as in response to balancing of the Wheatstone bridge, so that upon failure of current at said electrical instrument, the feeding of carbon dioxide into the enclosed space 11 past the ball valve 18 will be prevented.

What is claimed is:

1. A control apparatus for causing a gas to be fed into an enclosed space housing a second gas having physical properties different from the physical properties of said gas and for establishing and maintaining a gaseous content in said enclosed space consisting of said gas and said second gas and including a predetermined quantity of said gas, comprising a mechanism capable of operation to cause flow of said gas from a source of supply thereof into said enclosed space until the enclosed space contains said predetermined quantity of said gas, an entity adapted to be actuated to a plurality of different positions in response to alteration of the physical properties of the gaseous content in said enclosed space as caused by the presence of variable quantities of said gas in the enclosed space, including a position for said entity corresponding to a gaseous content in said enclosed space containing said predetermined quantity of said gas, means under the control of said entity for rendering said mechanism incapable of operation to cause substantial flow of said gas into the enclosed space when the entity is situated at its position corresponding to a gaseous content in said enclosed space containing said mentioned predetermined quantity of said gas, and means operative in response to differences in thermal conductivity of the gaseous content in the enclosed space resulting from alteration of the physical properties of said gaseous content to actuate and regulate the position of said entity.

2. A control apparatus for causing a gas to be fed into an enclosed space housing a second gas having physical properties different from the physical properties of said gas and for establishing and maintaining a gaseous content in said enclosed space consisting of said gas and said second gas and including a predetermined quantity of said gas, comprising a mechanism capable of operation to cause flow of said gas from a source of supply thereof into said enclosed space until the enclosed space contains said predetermined quantity of said gas, an electrical instrument including an entity thereof adapted to be actuated to a plurality of different positions in response to alteration of the physical properties of the gaseous content in said enclosed space as caused by the presence of variable quantities of said gas in said enclosed space, including a position for said entity corresponding to a gaseous content in said enclosed space containing said predetermined quantity of said gas, means controlled by said entity adapted to render said mechanism incapable of operation to cause flow of said gas into the enclosed space when the entity is situated at its position corresponding to a gaseous content in said enclosed space containing said mentioned predetermined quantity of said gas, and means operative in response to difference in thermal conductivity of the gaseous content in the enclosed space resulting from alteration of the physical properties of said gaseous content to actuate and regulate the position of said entity, said means including a fixed resistance, a resistance capable of adjustment in value, a resistance wire adapted to be subjected to the gaseous content in the enclosed space, a resistance wire adapted to be subjected to a gas other than the gaseous content in said enclosed space, and an electrical circuit including both of said resistances, both of said resistance wires and said instrument.

3. The combination as specified in claim 2, a switch element in engagement with and movable relatively to said resistance capable of adjustment in value, said switch element being constituted as a thermostatic compensator included in said electrical circuit and situated in said enclosed space, and a support for said switch element.

4. A control apparatus for causing a gas to be fed into an enclosed space housing a different gas and for establishing and maintaining a gaseous content in said enclosed space consisting of said gas and said different gas and including a predetermined quantity of said gas, comprising a source of supply of said gas, a pipe connection from said source of supply to said enclosed space, valve means for controlling flow of said gas from its source of supply through said pipe connection into said enclosed space, and means for regulating said valve means to cause flow of said gas from said source of supply into said enclosed space until the enclosed space contains said predetermined quantity of said gas and to cause the supply of said gas to said enclosed space to be discontinued when the enclosed space is made to contain said mentioned predetermined quantity of said gas, said means including a member such as a bellows adapted to be expanded by pressure, a resilient device for contracting said member, an outlet from said member, a valve for controlling said outlet to thus control pressure in said member, said valve being adapted to be moved to open position of the outlet upon expansion of said member to a predetermined extent to cause relief of pressure in said member and to thus render said resilient member capable of contracting said member and being adapted to be moved to closed position of the outlet upon contraction of the member to a predetermined extent to thus create pressure in said member and cause the member to be expanded, a mechanism responsive in its operation to movements of said member and capable of actuating said valve means to cause flow of said gas from said source of supply into said enclosed space until the enclosed space contains said predetermined quantity of said gas, and an element for rendering said mechanism incapable of actuating said valve means to cause flow of said gas from said source of supply into said enclosed space when the enclosed space is made to house said mentioned predetermined quantity of said gas.

5. The combination as specified in claim 4, a movable arm including a spring thereon for engaging said valve, an armature upon said arm, a permanent magnet for attracting said armature to cause said spring to maintain said valve in closed position of said outlet under flexed tension of said spring, said mechanism being adapted to actuate said movable arm in direction away from said valve to separate said armature from said magnet in response to expanding movement of said member and cause said spring to become unflexed, and a resilient entity adapted to be under increased tension when said member is expanded and under decreased tension when said member is contracted for causing said spring to be withdrawn from said valve with a snap action when said armature is caused to be separated from said magnet by expanding movement of said member, said mechanism being adapted to actuate said movable arm with spring in direction toward said valve in response to contracting movement of said member, and said magnet being adapted to attract said armature in opposition to decreased tension of said resilient entity when said arm with spring is moved toward said valve to cause said spring to close said valve with a snap action.

6. A control apparatus for causing a gas to be fed into an enclosed space housing a second gas having physical properties different from the physical properties of said gas and for establishing and maintaining a gaseous content in said enclosed space consisting of said gas and said second gas and including a predetermined quantity of said gas, comprising a source of supply of said gas, a pipe connection from said source of supply to said enclosed space, valve means for controlling flow of said gas from its source of supply through said pipe connection into said enclosed space, and mechanism for regulating said valve means to cause flow of said gas from said source of supply into said enclosed space until the enclosed space contains said predetermined quantity of said gas, said mechanism including a member such as a bellows adapted to be expanded by pressure, a resilient device for contracting said member, an outlet from said member, a valve for controlling said outlet to thus control pressure in said member, said valve being adapted to be moved to open position of the outlet upon expansion of said member to a predetermined extent to cause relief of pressure in said member and to thus render said resilient member capable of contracting said member and being adapted to be moved to closed position of the outlet upon contraction of the member to a predetermined extent to thus create pressure in said member and cause the member to be expanded, and an element responsive in its operation to movements of said member and capable of actuating said valve means to cause flow of said gas from said source of supply into said enclosed space until the enclosed space contains said predetermined quantity of said gas, and an entity responsive in its operation to alteration of the physical properties of the gaseous content in said enclosed space as caused by the presence of variable quantities of said gas in the enclosed space to cause the supply of said gas to said enclosed space to be discontinued and to render said mechanism incapable of actuating said valve means when the enclosed space is made to house said mentioned predetermined quantity of said gas.

7. A control apparatus comprising a mechanism capable of operation to cause flow of a gas from a source of supply thereof into an enclosed space housing a second gas having physical properties different from the physical properties of said gas, an entity adapted to assume different positions, means controlled by said entity when in a predetermined position for rendering said mechanism incapable of operation to cause flow of said gas into the enclosed space, and means including an electrical circuit adapted to have its characteristics altered in response to differences in the thermal conductivity of the gaseous content in said enclosed space as caused by the presence therein of varying quantities of said first mentioned gas for controllably actuating said entity, said means being adapted to cause said entity to move toward said predetermined position upon the lessening of the amount of electrical energy in said circuit and to move to said predetermined position upon the failure of electrical energy in said circuit.

8. A control apparatus comprising a structure providing an enclosed space adapted to house a gaseous mixture consisting of a gas and a second gas having physical properties different from the physical properties of said gas, mechanism for causing flow of said gas from a source of supply thereof into said enclosed space there to be commingled with said second gas, devices for establishing and maintaining a gaseous content in said enclosed space consisting of said gas and said second gas, said devices including an electrical circuit dependent in its characteristics upon the thermal conductivity of the gaseous content of said enclosed space to cause a predetermined quantity of said gas to be maintained in said enclosed space, and means constituted as part of said devices for rendering said mechanism incapable of supplying substantial quantities of said gas to said enclosed space upon failure of said circuit.

9. A control apparatus comprising a structure providing an enclosed space adapted to house a gaseous mixture consisting of a gas and a second gas having physical properties different from the physical properties of said gas, mechanism for causing flow of said gas from a source of supply thereof into said enclosed space there to be commingled with said second gas, devices for establishing and maintaining a gaseous content in said enclosed space consisting of said gas and said second gas, said devices including an electrical circuit dependent in its characteristics upon the thermal conductivity of the gaseous content of said enclosed space to cause a predetermined quantity of said gas to be maintained in said enclosed space, and means constituted as part of said devices adapted to cause the quantity of said gas included as a portion of said gaseous content to be decreased with lessening of the amount of electrical current in said circuit and to render said mechanism incapable of supplying substantial quantities of said gas to said enclosed space upon failure of said circuit.

EVERETT H. WHITE.